United States Patent
Oh et al.

(10) Patent No.: US 10,231,112 B1
(45) Date of Patent: Mar. 12, 2019

(54) METHOD AND SYSTEM FOR EMITTING PILOT BEACONS

(75) Inventors: Dae-Sik Oh, Overland Park, KS (US); Michael C. DeLaet, Belton, MO (US); Robert C. Pippert, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2796 days.

(21) Appl. No.: 12/547,687

(22) Filed: Aug. 26, 2009

(51) Int. Cl.
H04W 4/00 (2018.01)
H04W 8/04 (2009.01)

(52) U.S. Cl.
CPC ................................. *H04W 8/04* (2013.01)

(58) Field of Classification Search
None
See application file for complete search history.

(56) References Cited

U.S. PATENT DOCUMENTS

| | | | |
|---|---|---|---|
| 6,324,402 B1* | 11/2001 | Waugh et al. | 455/445 |
| 6,826,402 B1 | 11/2004 | Tran | |
| 6,970,719 B1* | 11/2005 | McConnell et al. | 455/554.1 |
| 7,471,950 B1 | 12/2008 | Oh et al. | |
| 2004/0198420 A1* | 10/2004 | He et al. | 455/552.1 |
| 2004/0219948 A1* | 11/2004 | Jones et al. | 455/552.1 |
| 2005/0195775 A1* | 9/2005 | Petite et al. | 370/338 |
| 2007/0060133 A1* | 3/2007 | Spitzer et al. | 455/445 |
| 2007/0275722 A1* | 11/2007 | Thorson | H04W 36/0055 455/436 |
| 2008/0163372 A1* | 7/2008 | Wang | 726/24 |
| 2009/0061873 A1* | 3/2009 | Bao et al. | 455/436 |
| 2009/0180429 A1* | 7/2009 | Stevens et al. | 370/329 |
| 2010/0054219 A1* | 3/2010 | Humblet et al. | 370/338 |
| 2012/0182970 A1* | 7/2012 | Ding | H04W 36/14 370/331 |

OTHER PUBLICATIONS

Unpublished U.S. Appl. No. 12/266,180, filed Nov. 6, 2008 in the name of Oh et al., entitled "Method and Apparatus for Providing a Pilot Beacon on Behalf of One or More Base Stations."
Unpublished U.S. Appl. No. 11/854,504, filed Sep. 12, 2007 in the name of Talley et al., entitled "Mitigating Interference by Low-Cost Internet-Base-Station (LCIB) Pilot Beacon with Macro-Network Communications."

\* cited by examiner

*Primary Examiner* — Jinsong Hu
*Assistant Examiner* — Alexander J Yi (57) ABSTRACT

Disclosed herein is a method for emitting pilot beacons. The method includes a base station system emitting a pilot beacon on a first air interface protocol. The base station system wirelessly receives a registration message for a mobile station that detected the pilot beacon on the first air interface protocol. The registration message includes a registration request seeking registration of the mobile station under the first air interface protocol with the base station system. In response to the received registration message, the base station system makes a determination that the mobile station is capable of operating on a second air interface protocol different from the first air interface protocol. In response to the determination, the base station system emits at least one pilot beacon on the second air interface protocol.

23 Claims, 3 Drawing Sheets

METHOD AND SYSTEM FOR EMITTING PILOT BEACONS

BACKGROUND

1. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another CDMA protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, iDEN and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g., voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

2. Femtocells

Many macro-network subscribers, including private consumers and small businesses, among others, in addition to having wireless service (which may include data service) for their mobile station (or mobile stations), also have high-speed (a.k.a. "broadband") Internet access through another communication channel, which may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g., IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g., in buildings) and for other reasons, macro-network service providers have recently begun offering consumers devices referred to herein as femtocells, which may also be referred to as femto base stations, femto base transceiver stations (BTSs), picocells (pico base stations, pico BTSs), microcells (micro base stations, micro BTSs), Low-Cost Internet Base Stations (LCIBs), and by other names. Note that the aforementioned terms that end in "cell" may also be generally and herein used to refer to the coverage area provided by the respective device. Note also that "low-cost" is not used as a limiting term; that is, devices of any cost may be categorized as LCIBs, though most LCIBs typically will be less expensive on average than most macro-network base stations.

A typical femtocell may be approximately the size of a desktop phone or WiFi access point, and is essentially a low-power, low-capacity version of a macro base station. Thus, a typical femtocell will use a normal power outlet, perhaps with a transformer providing a DC power supply. The femtocell may have a wired (e.g., Ethernet) or wireless (e.g., WiFi) connection with the user's router, and would thus have connectivity to the Internet and/or one or more other packet-data networks via the user's broadband connection. A femtocell may establish a virtual-private-network (VPN) connection over the Internet with an entity (e.g., a VPN terminator) on the wireless-service (macro-network) provider's core network, and thereby be able to securely communicate via the VPN terminator with other entities on that core network and beyond.

The femtocell also has a wireless-communication (e.g., CDMA) interface that is compatible with the user's mobile station(s), such that the femtocell may act as a micro base station, providing coverage on the wireless-service provider's network via the user's Internet connection. Usually, a femtocell will provide service on a single RF carrier (or on a single carrier per technology, where multiple technologies (e.g., 1xRTT and EV-DO) are supported), and also transmit what is known as a pilot beacon, which includes administrative messages and parameters that mobile stations use to connect with the femtocell.

Overview

Femtocells are designed to have low transmission-power capabilities, and consequently to provide coverage areas that are relatively limited in comparison with those of typical macro base stations. As examples, a typical femtocell may be designed to provide a coverage area that is the size of a dorm room, an apartment, a house, and so on. And along with limited transmission power, femtocells are also designed to have a relatively low capacity for serving mobile stations. For example, a femtocell may have the capacity (e.g., channel elements) to provide service to up to five mobile stations at any given time. Femtocells may provide wireless service according to a single wireless-communication protocol or a plurality of wireless communication protocols. Where multiple wireless communication protocols are supported by a single femtocell, the femtocell typically provides wireless service on multiple RF carriers (on a single carrier per technology).

Femtocells typically emit a pilot beacon that includes administrative messages and parameters that mobile stations can use to facilitate handoffs from the macro network to a femtocell carrier. A femtocell pilot beacon serves to advertise the femtocell's carrier (or carriers) in the femtocell's coverage area, such that mobile stations can opt to tune to that carrier (or carriers) and communicate via the femtocell. As such, a pilot beacon typically includes information that indicates the carrier (or carriers) that a mobile station should tune to in order to engage in communications via the femtocell.

If only a single carrier is provided by the surrounding macro network, the femtocell will transmit its pilot beacon only on that single macro-network carrier in order to advertise the femtocell's carrier or carriers. Such a pilot beacon is known as a fixed pilot beacon. However, if multiple carriers are provided by the surrounding macro network, the femtocell will typically cycle through those macro-network carriers, transmitting pilot beacons on each macro-network carrier for a fixed period of time, such as a few hundred milliseconds (ms) or perhaps one or two seconds. Such pilot beacons are known as a frequency-hopping pilot beacons.

As an example of when a femtocell would typically transmit frequency-hopping pilot beacons, consider a scenario where a macro network may provide service on three carriers, such as carriers A, B, and C. Further the macro network may provide service according to a plurality of air interface protocols, such as protocol A and protocol B. In this scenario, the macro network may provide service according protocol A on carrier A and service according to protocol B on carriers B and C.

Continuing this example, a femtocell may be located near the macro network, and this femtocell may provide service according to protocol A on a first carrier (e.g., carrier 1) and service according to protocol B on a second carrier (e.g., carrier 2). In order to advertise the femtocell's carriers 1 and 2 in the femtocell's coverage area, the femtocell may transmit frequency-hopping pilot beacons, which cycle through macro-network carriers A, B, and C, transmitting a pilot beacon on each macro-network carrier for some fixed amount of time. In most implementations, a femtocell would spend the same amount of time transmitting on each carrier, though this is not required. In this example, the femtocell may repeatedly transmit a protocol A pilot beacon on carrier A for one second, a protocol B pilot beacon on carrier B for one second, and a protocol B pilot beacon on carrier C for one second. By transmitting these frequency-hopping pilot beacons, the femtocell advertises to mobile stations operating on carrier A of the macro network to tune to carrier 1 in order to communicate via the femtocell on protocol A. Further, the femtocell advertises to mobile stations operating on carriers B and C of the macro network to tune to carrier 2 in order to communicate via the femtocell on protocol B.

However, in certain scenarios, it may be beneficial for a femtocell to limit the transmission of pilot beacons on a given air interface protocol while still maintaining the capability to serve mobile stations on the given air interface protocol. In accordance with the method disclosed herein, a femtocell emits a pilot beacon on a given air interface protocol only after determining that a mobile station within the range of the femtocell is capable of operating on the given air interface protocol. The method can apply in a scenario where a femtocell provides service according to at least two air interface protocols, such as the above scenario where the femtocell provides service according to protocol A and protocol B.

This method may be beneficial particularly in a scenario where a pilot beacon on the given air interface protocol causes more interference than a pilot beacon on a different air interface protocol. As is known in the art, a pilot beacon may interfere with the macro-network communications that are taking place at the same time and on the same carrier as the femtocell pilot beacon. Further, pilot beacons on certain air interface protocols tend to create more interference problems with the macro network than pilot beacons on other air interface protocols. For instance, in the example above, the protocol A pilot beacon may tend to create more interference with the macro network than the protocol B pilot beacon. Given the interference that protocol A pilot beacons may cause with the macro network, it would be beneficial to limit the interference caused by protocol A pilot beacons, while still providing some mechanism for the femtocell to serve mobile stations on that protocol. The method disclosed herein may operate to accomplish limiting such interference while still allowing for the femtocell to serve mobile stations on protocol A.

Accordingly, the method may involve a series of steps that result in a base station system emitting a pilot beacon on a given air interface protocol, such as protocol A, only after detecting that a mobile station capable of operating on the given protocol is in the range of the femtocell. In an embodiment, the base station system is a femtocell.

The method includes a base station system emitting a pilot beacon on a first air interface protocol, such as protocol B. A mobile station operating in the vicinity of the base station system may detect this pilot beacon and may thereafter send a registration message to the base station system. The registration message will include a registration request seeking registration of the mobile station under protocol B with the base station system. The base station system then wirelessly receives the registration message and, in response to the received registration message, makes a determination that the mobile station is capable of operating on a second air interface protocol, such as protocol A. In response to the determination, the base station system then begins to emit at least one pilot beacon on protocol A, so as to attract the mobile station to register with the base station system under protocol A.

The method can be usefully employed, for instance, in a femtocell that provides service according to 1×RTT and EV-DO. EV-DO pilot beacons typically cause more interference with a macro network than 1×RTT pilot beacons. EV-DO pilot beacons typically cause more interference than 1×RTT pilot beacons because, for instance, EV-DO has a fixed power output from a base station whereas 1×RTT has variable power. Accordingly, emitting EV-DO pilot beacons only after determining that an EV-DO capable mobile station is in the vicinity of the femtocell rather than continually emitting frequency-hopping EV-DO pilot beacons may prevent or reduce interference with the macro network caused by EV-DO pilot beacons.

In another respect, an exemplary system may be provided to accomplish the disclosed method. The exemplary system may include a base station and a base station network infrastructure accessible by the base station. The base station includes (i) at least one antenna structure for engaging in communication with a mobile station over an air interface, (ii) a broadband network port for connecting with a broadband communication network, (iii) a processor, and (iv) data storage. The base station in combination with the base station network infrastructure may perform the steps disclosed above. In particular, the base station emits a pilot beacon on a first air interface protocol and thereafter wirelessly receives a registration message for a mobile station that detected the pilot beacon on the first air interface protocol. This registration message includes a registration request seeking registration of the mobile station under the first air interface protocol with the base station. Further, in response to the received registration message, the base station system makes a determination that the mobile station is capable of operating on a second air interface protocol different from the first air interface protocol. Still further, in response to the determination, the base station system begins to emit at least one pilot beacon on a second air interface protocol, so as to attract the mobile station to register with the base station system under the second air interface protocol.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION

1. Introduction

As noted above, the disclosed method may involve a series of steps that result in a base station system emitting a pilot beacon on a given air interface protocol only after detecting that a mobile station capable of operating on the given protocol is in the range of the femtocell.

The method includes a base station system emitting a pilot beacon on a first air interface protocol. A mobile station operating in the vicinity of the base station system may detect this pilot beacon and may thereafter send a registration message to the base station system. The registration message will include a registration request seeking registration of the mobile station under the first air interface protocol with the base station system. The base station system then wirelessly receives the registration message and, in response to the received registration message, makes a determination that the mobile station is capable of operating on a second air interface protocol. In response to the determination, the base station system then begins to emit at least one pilot beacon on the second air interface protocol, so as to attract the mobile station to register with the base station system under the second air interface protocol.

In the following description, the method will primarily be described with 1×RTT and EV-DO as examples of the first and second air interface protocols. However, the method can apply with numerous other protocols instead or in addition. It should be understood that the first and second air interface protocols may be selected from any air interface protocols now known in the art or later developed.

2. Exemplary Architecture a. An Exemplary Communication System

Figure 1:
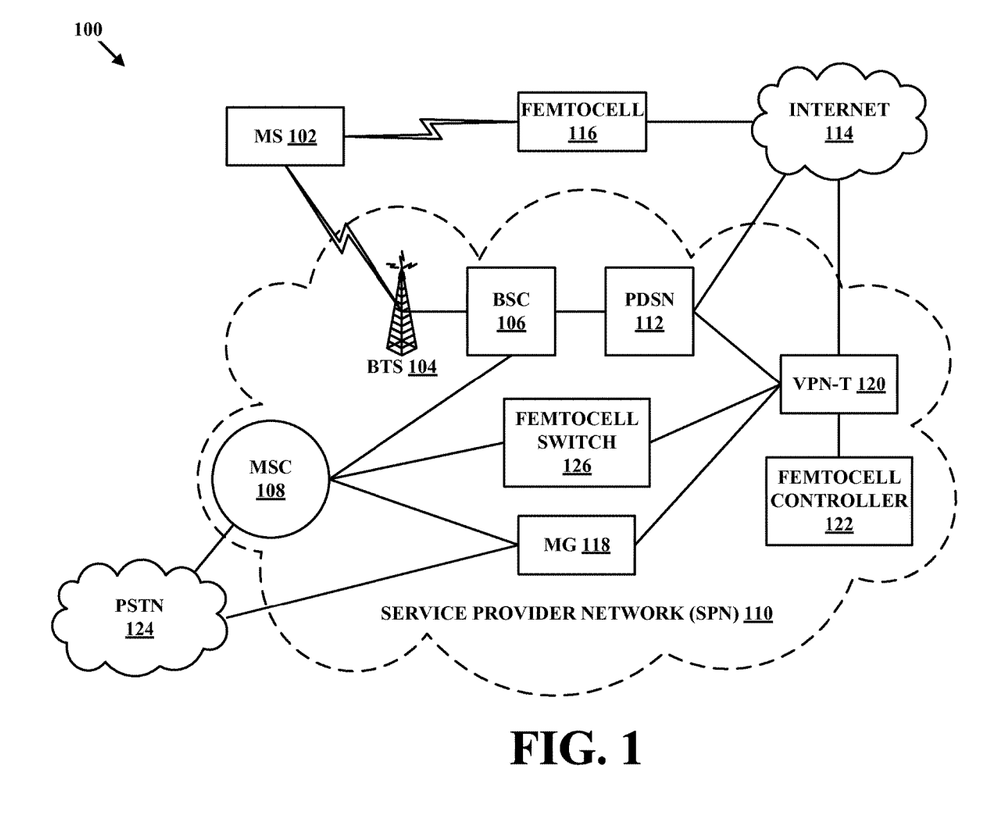
FIG. 1 depicts a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, a femtocell 116, a media gateway 118, a VPN terminator (VPN-T) 120, a femtocell controller 122, a public switched telephone network (PSTN) 124, and a femtocell switch 126. And additional entities could be present as well, such as additional mobile stations in communication with BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between femtocell 116 and Internet 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions.

The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more femtocells over suitable air interfaces. For example, the chipset could be suitable for communication on a first and second air interface protocol, such as 1×RTT and EV-DO. The chipset or wireless-communication interface in general may also or instead be able to communicate with other types of networks and devices, such as Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid 1×RTT/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more 1×RTT and EV-DO (and/or other protocols) coverage areas such as cells and sectors, for communicating with mobile stations such as mobile station 102 over an air interface. The communication interface may also include one or more wired (e.g., Ethernet) and/or wireless (e.g., WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106, MG 118, femtocell switch 126, and PSTN 124. In general, MSC 108 acts as a switch between (a) PSTN 124 and (b) (i) one or more BSCs such as BSC 106 and (ii) one or more femtocell switches such as femtocell switch 126, facilitating communication between mobile stations and PSTN 124, which may be the public switched telephone network.

Service-provider network 110 may encompass all of the network elements depicted in FIG. 1 as being included in its dashed-cloud shape. In general, there may be fewer, more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106, VPN terminator 120, and Internet 114. In general, PDSN 112 acts as a network access server between (a) Internet 114 and (b) (i) BSCs such as BSC 106 and (ii) VPN terminators such as VPN terminator 120, facilitating packet-data communication between mobile stations and Internet 114, via macro base stations and femtocells.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

Femtocell 116 may be any computing and communication device arranged to carry out the femtocell functions described herein. As such, femtocell 116 may include a communication interface, a processor, and data storage comprising instructions executable by the processor for carrying out those femtocell functions. The communication interface may include (a) a wireless interface for communicating with one or more mobile stations according to protocols such as 1×RTT and EV-DO (and/or one or more other technologies) and (b) an Ethernet or WiFi interface for communicating with a device such as a router and/or a cable modem. Femtocell 116 may also have a GPS receiver and/or other location module. Femtocell 116 is also described in connection with FIG. 2.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. In operation, MG 118 may (a) receive packet-based communications from entities on SPN 110, convert those to circuit-switched communications, and pass them to MSC 108 and/or PSTN 124 and (b) receive circuit-switched communications from MSC 108 and/or PSTN 124, convert those to packet-based communications, and pass them to entities on SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least PDSN 112, MG 118, femtocell controller 122, femtocell switch 126, and Internet 114. In general, VPN terminator 120 functions to establish secure VPN connections over Internet 114 with femtocells such as femtocell 116, enabling the femtocells to securely communicate with devices on SPN 110 and perhaps beyond.

Femtocell controller 122 may be any networking element arranged to carry out the femtocell-controller functions described herein. Thus, femtocell controller 122 may include a communication interface, a processor, and data storage comprising instructions executable by the processor for carrying out those femtocell-controller functions. The communication interface may include one or more wired and/or wireless interfaces for communicating with at least VPN terminator 120, along with perhaps one or more other entities on SPN 110, and beyond.

Among other functions, femtocell controller 122 communicates via VPN terminator 120 with femtocells such as femtocell 116. Femtocell controller 122 may receive requests from various femtocells for configuration data, and those requests may include, among other values, indications of the femtocells' respective locations. Femtocell controller 122 may also be operable to select various operational parameters for femtocells (e.g., whether to broadcast a pilot-beacon, contents of any pilot beacon to be broadcast, transmission-power level), and to transmit those parameters to femtocells, perhaps along with other configuration data and messaging.

Femtocell switch 126 may be any networking element arranged to carry out the femtocell-switch functions described herein. As such, femtocell switch 126 may include a communication interface, a processor, and data storage comprising instructions executable by the processor for carrying out those femtocell-switch functions. The communication interface may include one or more wired and/or wireless interfaces for communicating with at least MSC 108 and VPN terminator 120. In general, femtocell switch 126 acts as a switch between MSC 108 and VPN terminator 120, enabling mobile stations communicating via femtocells to engage in calls over PSTN 124 via MSC 108.

b. An Exemplary Femtocell

Figure 2:
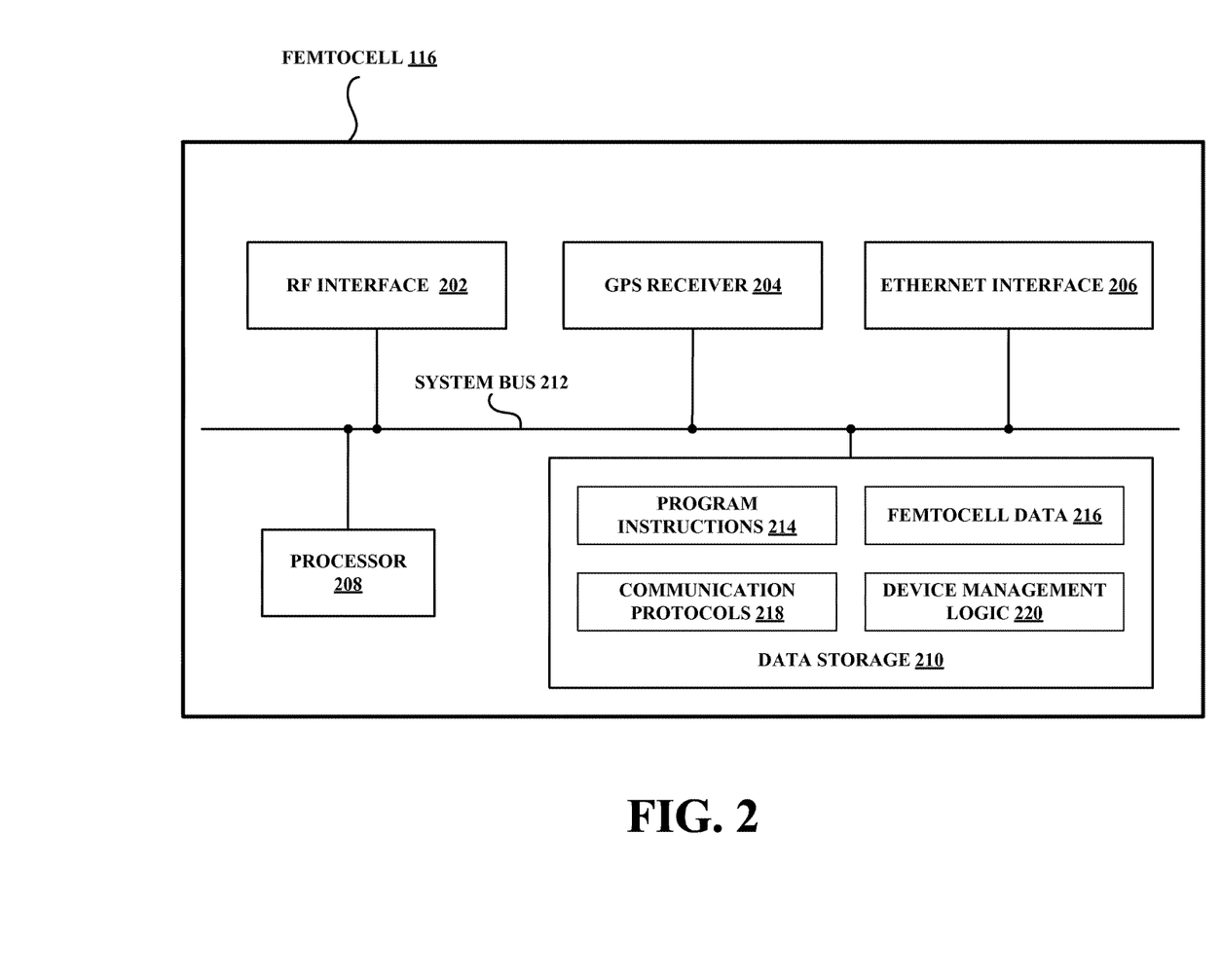
FIG. 2 depicts a femtocell, in accordance with exemplary embodiments.

FIG. 2 is a diagram of an exemplary femtocell 116, which includes an RF interface 202, a GPS receiver 204, an Ethernet interface 206, a processor 208, and data storage 210, all communicatively linked by a system bus 212. Note that femtocell 116 could have additional and/or different components, and that this structure is provided by way of example.

RF interface 202 may include one or more antennas, one or more chipsets, a set of one or more channel elements, and/or one or more other components suitable for providing a wireless coverage area according to at least two air interface protocols, such as 1×RTT and EV-DO. GPS receiver 204 may be any known or hereafter-developed GPS receiver, suitable for receiving and decoding GPS signals for location and timing purposes, perhaps among other purposes. In some embodiments, a femtocell may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable storage medium, and may include (a) program instructions 214 executable by processor 208 for carrying out the femtocell functions described herein, (b) femtocell data 216, which may be any operational data or other type of data stored for use by femtocell 116, (c) communication protocols 218, facilitating and enabling communication with one or more other devices, and (d) device management logic 220, perhaps for memory and file management.

3. Exemplary Operation

Figure 3:
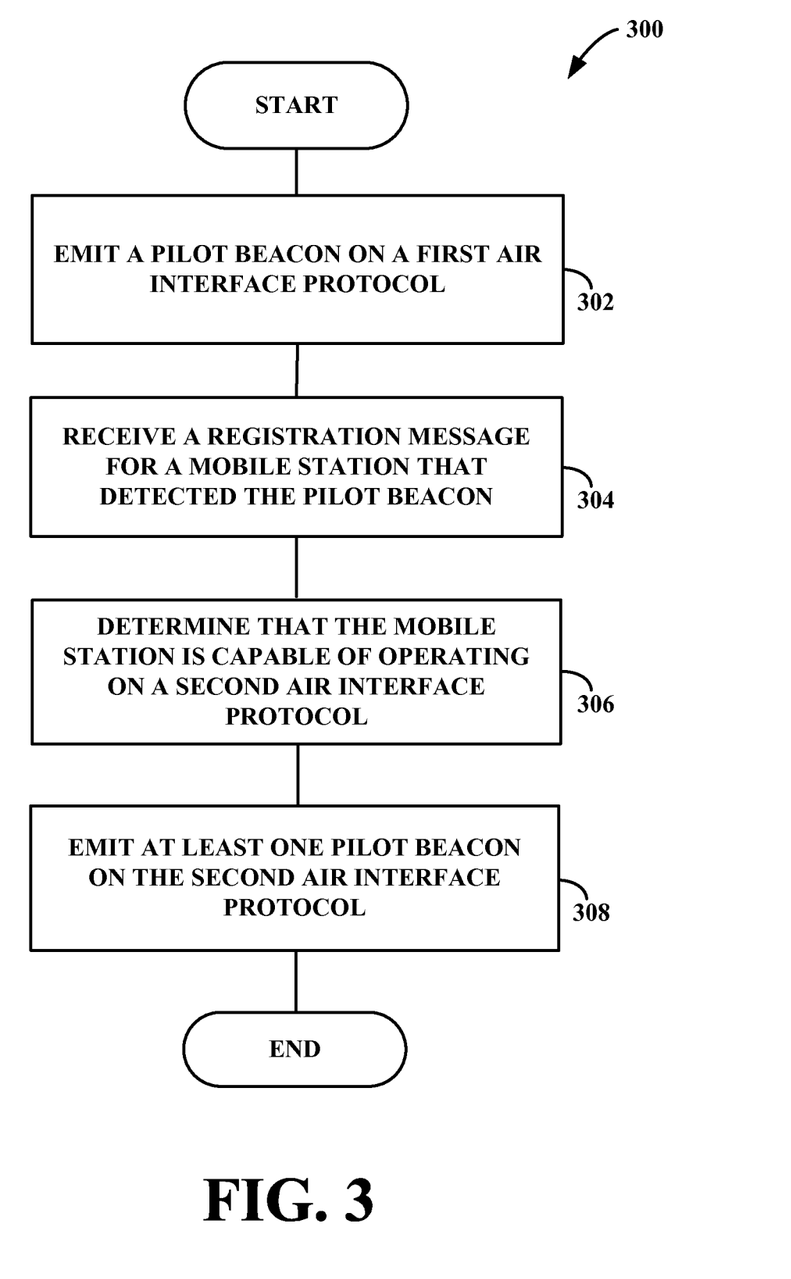
FIG. 3 depicts a flowchart of a method, in accordance with exemplary embodiments.

FIG. 3 is a flowchart of an exemplary method 300, in accordance with an exemplary embodiment. As shown in FIG. 3, method 300 begins at step 302, where a base station system emits a pilot beacon on a first air interface protocol. At step 304, the base station system then wirelessly receives a registration message for a mobile station that detected the emitted pilot beacon on the first air interface protocol. This registration message includes a registration request seeking registration of the mobile station under the first air interface protocol with the base station system. At step 306, in response to the received registration message, the base station system makes a determination that the mobile station is capable of operating on a second air interface protocol different from the first air interface protocol. Then, at step 308, the base station system, in response to the determination, begins to emit at least one pilot beacon on a second air interface protocol, so as to attract the mobile station to register with the base station system under the second air interface protocol.

These steps are further explained in the following subsections. These steps include functions that may be carried out by an element or elements in a base station system. For instance, these functions can be carried out by a base station (e.g., femtocell 116) and/or by one or more other components of a base station system, such as femtocell controller 116, femtocell switch 126, and/or other entities. In general, method 300 could be carried out by any one or any combination of the base station network infrastructure elements described herein, or any other network element(s).

Further, in the following description, the first air interface protocol is 1×RTT and the second air interface protocol is EV-DO. As described, 1×RTT pilot beacons typically cause less interference issues with a macro network than EV-DO pilot beacons. However, as noted above, the first and second air interface protocols may be selected from any air interface protocols now known in the art or later developed. For instance, the first and second air interface protocols could each be selected from the group consisting of 1×RTT, EV-DO, iDEN, TDMA, AMPS, GSM, GPRS, UMTS, EDGE, WiMAX, LTE, microwave, satellite, MMDS, and Wi-Fi.

i. Emitting a Pilot Beacon on a First Air Interface Protocol

At step 302, the base station system emits a 1×RTT pilot beacon. However, at this time, the base station system does not emit any EV-DO pilot beacons.

In an example of step 302, femtocell 116 emits the 1×RTT pilot beacon. Femtocell controller 122 may instruct femtocell to emit the 1×RTT pilot beacon. The femtocell 116 is operable to serve mobile stations under both 1×RTT and EV-DO. In this example, femtocell 116 may provide service under 1×RTT on a first carrier and the femtocell may provide service under EV-DO on a second carrier. In another example, femtocell 116 may provide service under both 1×RTT and EV-DO on a single carrier. For instance, where femtocell 116 operates on a single carrier, the femtocell could be designed so as to provide service under these two protocols at different times.

Continuing the above example, femtocell 116 may emit the 1×RTT pilot beacon on the same carrier(s) that the macro network provides 1×RTT service on. As is known in the art, a macro network may provide service on multiple carriers and according to a plurality of air interface protocols. For instance, the macro network may provide service on carrier A under EV-DO, carrier B under 1×RTT, and carrier C under 1×RTT. At this step 302, femtocell 116 may transmit frequency-hopping 1×RTT pilot beacons that cycle through carriers B and C. However, femtocell 116 does not transmit frequency-hopping EV-DO pilot beacons on carrier A. Thus, at this time, the frequency-hopping pilot beacons may advertise to mobile stations operating on the macro network that femtocell 116 provides service under 1×RTT. However, the pilot beacons do not advertise to mobile stations operating on the macro network that femtocell 116 provides service under EV-DO.

ii. Receiving a Registration Request for a Mobile Station

At step 304, the base station system wirelessly receives a registration message for a mobile station that detected the emitted 1×RTT pilot beacon.

In an example of step 304, femtocell 116 may wirelessly receives the registration message for mobile station 102. A mobile station, such as mobile station 102, that is capable of operating under 1×RTT and is in the vicinity of femtocell 116 may detect a 1×RTT pilot beacon emitted by femtocell 116. Mobile station 102 may detect this pilot beacon on carrier B and/or a 1×RTT pilot beacon carrier C. Responsive to detecting the 1×RTT pilot beacon, mobile station 102 may send a registration message to femtocell 116 so that the mobile station may begin to communicate via the femtocell.

This registration message includes a registration request seeking registration of mobile station 102 under 1×RTT. After femtocell 116 receives this registration message seeking registration under 1×RTT, the base station system may then register the mobile station under 1×RTT. Thus, mobile station 102 may communicate via femtocell 116 under 1×RTT. However, in an alternative example, the base station system may opt to not register the mobile station 102 with femtocell 116.

iii. Determining that the Mobile Station is Capable of Operating on a Second Air Interface Protocol In response to the received registration message from mobile station 102, at step 306, the base station system makes a determination that mobile station 102 is capable of operating on EV-DO. Various entities in the base station system may make this determination. For example, femtocell 116 may make this determination on its own or in conjunction with other entities in the base station system. These other entities may include entities in the base station network infrastructure, such as femtocell controller 122.

Further, the base station system may make this determination that mobile station 102 is capable of operating on EV-DO in a variety of ways. For instance, the base station system may determine that mobile station 102 is capable of operating on EV-DO based on a chipset version of the mobile station and/or a service profile of the mobile station.

In an example of step 306, femtocell 116 (and/or the femtocell supporting infrastructure) determines, based on the chipset version of mobile station 102, that the mobile station is capable of operating on EV-DO. The chipset, for example, may be a dual-mode chipset version that indicates a mobile station's capability to operate under both 1×RTT and EV-DO. The received registration message may include data specifying the chipset version of the mobile station. Thus, making a determination that the mobile station is capable of operating on EV-DO may include femtocell 116 and/or the femtocell supporting infrastructure reading the data and determining whether the data indicates that the mobile station is capable of operating on EV-DO.

In another example of step 306, femtocell 116 (and/or the femtocell supporting infrastructure) determines that mobile station 102 is capable of operating on EV-DO based on a service profile of mobile station 102. Femtocell 116 may make a determination that mobile station 102 is capable of operating on EV-DO by (i) referring to the service profile of mobile station 102 and (ii) determining whether the service profile indicates that mobile station 102 is capable of operating on EV-DO. The service profile may include data specifying the air interface protocols that mobile station 102 can operate on. Additionally or alternatively, femtocell 116 may make a determination that mobile station 102 is capable of operating on EV-DO by determining whether the service profile indicates that a user of mobile station 102 subscribes to service for operating on EV-DO.

The base station system may access the service profile in a variety of ways in order to make this determination. For example, the base station may receive a copy of the service profile or data related to the service profile from a network entity in communication with the base station system. The service profile may be stored at a network entity in communication with the base station system. For example, the service profile may be stored at MSC 108 and/or at a home location register (HLR) (not depicted). As an example, MSC 108 and/or an HLR may store a registration notification return result (REGNOT_rr) or a Qualification Directive (QUALDIR), and the REGNOT_rr and QUALDIR may in turn include the service profile of the mobile station. As is known in the art, when mobile station 102 enters the network served by BTS 104, mobile station 102 may send an access probe to BTS 104. BSC 106 may then trigger MSC 108 to send a REGNOT through the signaling network to an HLR. The HLR may receive the REGNOT, and the REGNOT may indicate to the HLR that MSC 108 is serving mobile station 102. In response to receiving the REGNOT, the HLR may authenticate and update the registration of mobile station 102 to indicate that mobile station 102 is now served by MSC 108. The HLR may then send MSC 108 a REGNOT_rr, and the REGNOT_rr may carry with it a copy of the service profile of mobile station 102. Further, the HLR may store a copy of the REGNOT_rr in the HLR. The service profile may also be provided in a QUALDIR, which typically carries the service profile of a mobile station and is sent from the HLR to the MSC in response to any change in the service profile. Alternatively, a QUALDIR may be sent from the HLR to the MSC periodically. The service profile may be located at other network entities as well.

Thus, MSC 108, an HLR, and/or other network entities may maintain a copy of the service profile of mobile station 102. In an example of the disclosed method, these entities may send the service profile to the base station system (e.g., to femtocell 116 or femtocell controller 122) so that the base station system may determine whether the service profile indicates that the mobile station is capable of operating on EV-DO. In an alternative example of the disclosed method, these network entities may determine whether the service profile indicates that the mobile station is capable of operating on EV-DO, and thereafter may send that determination to the base station system. Based on the received determination from an entity in communication with the base station system, the base station system is capable of determining that the mobile station is capable of operating on EV-DO.

As mentioned above, the femtocell supporting infrastructure (rather than femtocell 116 itself) may make the determination that the mobile station is capable of operating on EV-DO. In such a case, the supporting infrastructure of femtocell 116 may direct femtocell 116 to begin emitting an EV-DO pilot beacon. For instance, femtocell controller 122 makes the determination that the service profile indicates that the mobile station is capable of operating on EV-DO and then instructs femtocell 116 to emit at least one EV-DO pilot beacon.

In still yet another example, the service profile may be included in the registration message for mobile station 102, and the base station system may use this registration message including the service profile to determine whether the service profile indicates that the mobile station is capable of operating on EV-DO.

iv. Emitting at Least One Pilot Beacon on the Second Air Interface Protocol

At step 308, in response to the determination at step 306, the base station system emits at least one pilot beacon on EV-DO, so as to attract mobile station 102 to register with femtocell 116 under EV-DO. In an example of step 308, femtocell 116 emits at least one pilot beacon on EV-DO.

After femtocell 116 emits at least one EV-DO pilot beacon, mobile station 102 may detect at least one of the at least one EV-DO pilot beacons. In response to detecting this at least one EV-DO pilot beacon, mobile station 102 may send a second registration message to femtocell 116. This second registration message includes a registration request seeking registration of mobile station 102 under EV-DO. Femtocell 116 may then wirelessly receive this registration message and may thereafter register mobile station 102 under EV-DO. Thus, mobile station 102 may communicate via femtocell 116 under EV-DO.

As mentioned above, the macro network may provide service on carrier A under EV-DO, carrier B under 1×RTT, and carrier C under 1×RTT. Thus in this example, at step 308, the femtocell 116 may begin to transmit frequency hopping pilot beacons that cycle through carriers A, B, and C. For instance, femtocell 116 may transmit an EV-DO pilot beacon on carrier A for one second, a 1×RTT pilot beacon on carrier B for one second, and a 1×RTT pilot beacon on carrier C for one second. In an alternative example, femtocell may emit only EV-DO pilot beacons on carrier A for a set period of time rather than frequency-hopping pilot beacons that cycle through carriers A, B, and C. Emitting only EV-DO pilot beacons on carrier A for a set period of time, such as three or more seconds, may serve to attract the mobile station to register with the base station system under EV-DO more quickly than in a scenario where the femtocell emits frequency-hopping pilot beacons that cycle through carriers A, B, and C every one second.

After mobile station 102 detects the EV-DO pilot beacon and registers with femtocell 116 under EV-DO, femtocell 116 may stop emitting pilot beacons on EV-DO. Beneficially, no longer emitting EV-DO pilot beacons after mobile 102 station registers with the femtocell under EV-DO may minimize interference that could be caused by additional EV-DO pilot beacons.

However, after mobile station 102 registers with femtocell 116, the femtocell preferably continues emitting 1×RTT pilot beacons. Thus, the disclosed method may be repeated for new mobile stations in the vicinity of the base station system. New mobile stations that enter the vicinity of femtocell 116 may detect these 1×RTT pilot beacons and send registration messages to the femtocell. When a new mobile station sends a registration message seeking registration under 1×RTT, femtocell 116 may then determine whether that new mobile station is capable of operating on EV-DO. If the new mobile station is capable of operating on EV-DO, femtocell 116 may begin emitting EV-DO pilot beacons again, so as to attract the new mobile station to register with the femtocell under EV-DO.

After mobile station 102 registers with femtocell 116 under EV-DO, the mobile station may be registered with the femtocell 116 under both 1×RTT and EV-DO. As know in the art, mobile stations may be dual-mode mobile stations that are capable of operating under two air interface protocols at the same time. Thus, mobile station 102 may operate under both 1×RTT and EV-DO at the same time. Alternatively, as mentioned above, femtocell 116 could reject the 1×RTT registration request and only register the mobile station under EV-DO. Therefore, in such a scenario, mobile station 102 would only register with femtocell 116 under EV-DO rather than under both 1×RTT and EV-DO.

Beneficially, in accordance with the disclosed method, a base station system may serve mobile stations under two (or more) air interface protocols while reducing interference that may be caused by pilot beacons on one (or more) of the air interface protocols. Thus, a base station system may limit the need to transmit pilot beacons on a given air interface protocol, where the pilot beacons are likely to cause interference problems. However, the base station system may beneficially still maintain the capability to serve mobile stations on that given air interface protocol.

4. Conclusion

Various exemplary embodiments have been described above. Those skilled in the art will understand, however, that changes and modifications may be made to those examples without departing from the scope of the claims.

We claim:

1. A method of emitting pilot beacons, the method comprising:
    a base station system emitting a pilot beacon on a first air interface protocol;
    the base station system wirelessly receiving a registration message for a mobile station that detected the pilot beacon on the first air interface protocol, the registration message including a registration request seeking registration of the mobile station under the first air interface protocol with the base station system;
    in response to the received registration message, the base station system making a determination that the mobile station is capable of operating on a second air interface protocol different from the first air interface protocol; and
    in response to the determination, the base station system emitting at least one pilot beacon on the second air interface protocol, so as to attract the mobile station to register with the base station system under the second air interface protocol.

2. The method of claim 1, further comprising:
    in response to the received registration message, the base station system registering the mobile station under the first air interface protocol.

3. The method of claim 1, wherein the mobile station detects at least one of the at least one pilot beacon on the second air interface protocol, the method further comprising:
    the base station system wirelessly receiving a second registration message for the mobile station, the second registration message including a registration request seeking registration of the mobile station under the second air interface protocol with the base station system.

4. The method of claim 3, further comprising:
    in response to the received second registration message, the base station system registering the mobile station under the second air interface protocol.

5. The method of claim 4, further comprising:
    in response to the base station system registering the mobile station under the second air interface protocol, the base station system stopping emitting the at least one pilot beacon on the second air interface protocol.

6. The method of claim 1, wherein the mobile station detects the pilot beacon on the second air interface protocol, the method further comprising:
    in response to the received registration message, the base station system registering the mobile station under the first air interface protocol;
    the base station system wirelessly receiving a second registration message for the mobile station, the second registration message including a registration request seeking registration of the mobile station under the second air interface protocol with the base station system; and in response to the received second registration message, the base station system registering the mobile station under the second air interface protocol, wherein the mobile station operates in a dual mode under both the first and second air interface protocols.

7. The method of claim 1, further comprising:
in response to the determination, the base station system further rejecting the registration request.

8. The method of claim 1, wherein the base station system comprises a femtocell.

9. The method of claim 8, wherein the femtocell is equipped to serve mobile stations under both the first air interface protocol and the second air interface protocol.

10. The method of claim 1, wherein the first air interface protocol is 1×RTT and the second air interface protocol is EV-DO.

11. The method of claim 1, wherein the received registration message includes data specifying a chipset version of the mobile station, and wherein making a determination that the mobile station is capable of operating on the second air interface protocol different from the first air interface protocol comprises determining whether the chipset version indicates that the mobile station is capable of operating on the second air interface protocol.

12. The method of claim 11, wherein the chipset version is a dual-mode chipset version capable of operating under both the first air interface protocol and the second air interface protocol.

13. The method of claim 1, wherein making a determination that the mobile station is capable of operating on the second air interface protocol different from the first air interface protocol comprises (i) referring to a service profile of the mobile station and (ii) determining whether the service profile indicates that the mobile station is capable of operating on the second air interface protocol.

14. The method of claim 13, wherein the service profile is located at a network entity in communication with the base station system.

15. The method of claim 14, wherein the network entity is selected from the group consisting of an HLR and an MSC.

16. The method of claim 15, wherein the service profile is provided to at least one of the HLR and MSC in at least one of a QUALDIR or a REGNOT_rr.

17. The method of claim 1, wherein making a determination that the mobile station is capable of operating on the second air interface protocol different from the first air interface protocol comprises (i) referring to a service profile of the mobile station and (ii) determining whether the service profile indicates that a user of the mobile station subscribes to service for operating on the second air interface protocol.

18. The method of claim 1, wherein the first and second air interface protocols are each selected from the group consisting of 1×RTT, EV-DO, iDEN, TDMA, AMPS, GSM, GPRS, UMTS, EDGE, WiMAX, LTE, microwave, satellite, MMDS, and Wi-Fi.

19. A base station system comprising:
a base station, wherein the base station comprises (i) at least one antenna structure for engaging in communication with a mobile station over an air interface, (ii) a broadband network port for connecting with a broadband communication network, (iii) a processor, and (iv) data storage;
a base station network infrastructure accessible by the base station via the broadband network,
wherein the base station emits a pilot beacon on a first air interface protocol,
wherein the base station wirelessly receives a registration message for a mobile station that detected the pilot beacon on the first air interface protocol, the registration message including a registration request seeking registration of the mobile station under the first air interface protocol with the base station,
wherein, in response to the received registration message, the base station system makes a determination that the mobile station is capable of operating on a second air interface protocol different from the first air interface protocol, and
wherein, in response to the determination, the base station system begins to emit at least one pilot beacon on a second air interface protocol, so as to attract the mobile station to register with the base station system under the second air interface protocol.

20. The base station system of claim 19, wherein the base station is a femtocell.

21. The base station system of claim 19, wherein making the determination that the mobile station is capable of operating on a second air interface protocol different from the first air interface protocol is carried out by an entity located in the base station network infrastructure.

22. The base station system of claim 21, wherein the base station network infrastructure comprises at least one of a femtocell controller and a femtocell switch.

23. The base station system of claim 19, wherein the first and second air interface protocols are selected from the group consisting of 1×RTT, EV-DO, iDEN, TDMA, AMPS, GSM, GPRS, UMTS, EDGE, WiMAX, LTE, microwave, satellite, MMDS, and Wi-Fi.

* * * * *